United States Patent [19]
Glenn et al.

[11] Patent Number: 5,455,886
[45] Date of Patent: Oct. 3, 1995

[54] ELECTRICAL IMPLEMENT WITH VARIABLE SPEED CONTROL

[75] Inventors: William K. Glenn, III; G. Michael Hornick; James F. Barnes, Jr., all of Anderson, S.C.

[73] Assignee: Ryobi Motor Products Corporation, S.C.

[21] Appl. No.: 249,752

[22] Filed: May 26, 1994

[51] Int. Cl.$^6$ ..................................................... H02P 7/288
[52] U.S. Cl. ........................... 388/838; 388/827; 388/937
[58] Field of Search ..................... 60/408, 427; 388/838, 388/840, 824, 827, 937

[56] References Cited

U.S. PATENT DOCUMENTS

| | | |
|---|---|---|
| 3,327,196 | 6/1967 | Sahrbacker . |
| 3,456,230 | 7/1969 | Matthews et al. . |
| 3,539,748 | 11/1970 | Neumeier . |
| 3,543,120 | 11/1970 | Robertson . |
| 3,590,194 | 6/1971 | Frenzel et al. ........................ 318/345 |
| 3,736,391 | 5/1973 | Caviar . |
| 3,825,703 | 7/1974 | Berthier . |
| 3,825,704 | 7/1974 | Brauer . |
| 4,057,752 | 11/1977 | Artrip et al. ......................... 318/345 |
| 4,236,103 | 11/1980 | Matthey et al. ....................... 318/345 |
| 4,296,363 | 10/1981 | Blake et al. . |
| 4,406,982 | 9/1983 | McClellan, Jr. ....................... 318/345 |
| 4,408,244 | 10/1983 | Weible . |
| 4,421,251 | 12/1983 | Namadari et al. ..................... 318/305 |
| 4,992,709 | 2/1991 | Griffin .................................... 388/839 |
| 5,003,769 | 4/1991 | Cantwell . |
| 5,043,544 | 8/1991 | Daniels . |
| 5,043,545 | 8/1991 | Yamashita et al. . |

Primary Examiner—William M. Shoop, Jr.
Assistant Examiner—Karen Masih
Attorney, Agent, or Firm—Brooks & Kushman

[57] ABSTRACT

An electrical implement having a bypass mechanism for controlling a variable speed motor is disclosed. The implement includes a tool, a variable speed electrical motor activatable for driving the tool, a housing supporting the motor and tool, and a control knob for controlling the speed of the motor. The control mechanism includes an on/off switch and a variable speed control circuit. The variable speed control circuit includes a variable resistance rheostat and bypass switch. The control knob controls whether the bypass switch causes current to bypass the rheostat to operate the motor at a predetermined speed or else whether the resistance in the rheostat is variable to change the speed of the motor. The control mechanism includes a cantilevered beam engageable by the control knob to operate the bypass switch. The cantilevered beam is sufficiently flexible to allow for large deflections while placing only limited force across the bypass switch.

13 Claims, 3 Drawing Sheets

ELECTRICAL IMPLEMENT WITH VARIABLE SPEED CONTROL

FIELD OF INVENTION

The present invention relates to electrical implements having variable speed motors and control mechanisms for varying the speed of the motors.

BACKGROUND ART

While using electrically powered implements it is often advantageous to vary the speed of a motor driving a tool or implement. For example, a vacuum cleaner having a motor driving a fan may do a satisfactory job of cleaning at a certain minimum motor speed. By operating at the minimum speed, minimal energy is consumed and the vacuum cleaner operates very efficiently. Further, the vacuum cleaner also runs quieter at lower speeds.

However, certain circumstances exist where a greater vacuum is desired, such as when vacuuming a shag carpet. The greater vacuum requires that the motor and fan be operated at an increased speed. In the event that the vacuum is to be run at a top speed, it desirable to have a control mechanism which is easily and reliably positioned to operate the vacuum at the top speed.

Another problem that control mechanisms often have is that components used to construct a control mechanism must be precisely manufactured and assembled in order for the control mechanism to operate properly. The present invention meets the need for an easily operable control mechanism for a variable speed motor which is designed to accommodate large tolerances in individually manufactured components comprising the control mechanism and also to accommodate assembly stack-up of these components while providing good reliability.

SUMMARY OF THE INVENTION

An electrical implement having a bypass mechanism for controlling a variable speed motor is disclosed. The implement includes a tool for operating on an object, a variable speed electrical motor activatable for driving the tool, a housing supporting the motor and tool, and a control unit for controlling the speed of the motor. The tool may include a fan creating a vacuum for collecting dirt or debris. The control unit preferably includes an on/off switch and a variable speed control circuit. The on/off switch is selectively positionable between closed and open positions to activate and deactivate the motor.

The variable speed control circuit includes a variable resistance rheostat and a bypass switch. The control circuit is in series with the motor and the on/off switch. The control unit includes a control knob used to selectively control the variable resistance of the rheostat and the opening and closing of the bypass switch. When the on/off switch is closed, the motor is activated. When the bypass switch is closed, the motor is operated at a predetermined speed and when the bypass switch is opened, the resistance of the rheostat is variable by the control knob to operate the motor and tool at a speed other than the predetermined speed.

Preferably, the control unit includes a cantilevered beam having a first fixed end fixed relative to the housing, a second free end movable relative to the first end and engageable with the bypass switch to operate the bypass switch, and a central span extending between the fixed and free ends. When the control knob is moved to a predetermined position, the control knob depresses and flexes the central span of the beam with the free end operating the bypass switch.

It is an object of the present invention to provide an electrical implement having a motor and a control mechanism including a rheostat and a bypass switch such that the motor can be operated at a predetermined speed, or else, the rheostat can be adjusted to operate the motor in a variable speed mode.

It is another object to provide a control mechanism utilizing a control knob to depress a central span on a cantilevered beam to move a free end of the beam causing a pair of contacts on a bypass switch to be closed, the cantilevered beam being sufficiently flexible such that the central span can move through a wide range of motion with the free end closing the contacts without causing damage to the contacts or control mechanism and allowing for large manufacturing and assembly stack-up tolerances on the components of the control mechanism.

It is still yet another object to provide a control mechanism having a rotatable knob including a grip portion and a stem connected to a rheostat and having a ramp on the grip portion, whereby rotating the control knob both the resistance in the rheostat is adjustable and the ramp is engageable with a bypass switch to operate the bypass switch.

BRIEF DESCRIPTION OF THE DRAWINGS

These and other objects, features, and advantages of the present invention will become better understood with regard to the following description, pending claims and accompanying drawings where:

DESCRIPTION OF THE BEST MODE

Figure 1:
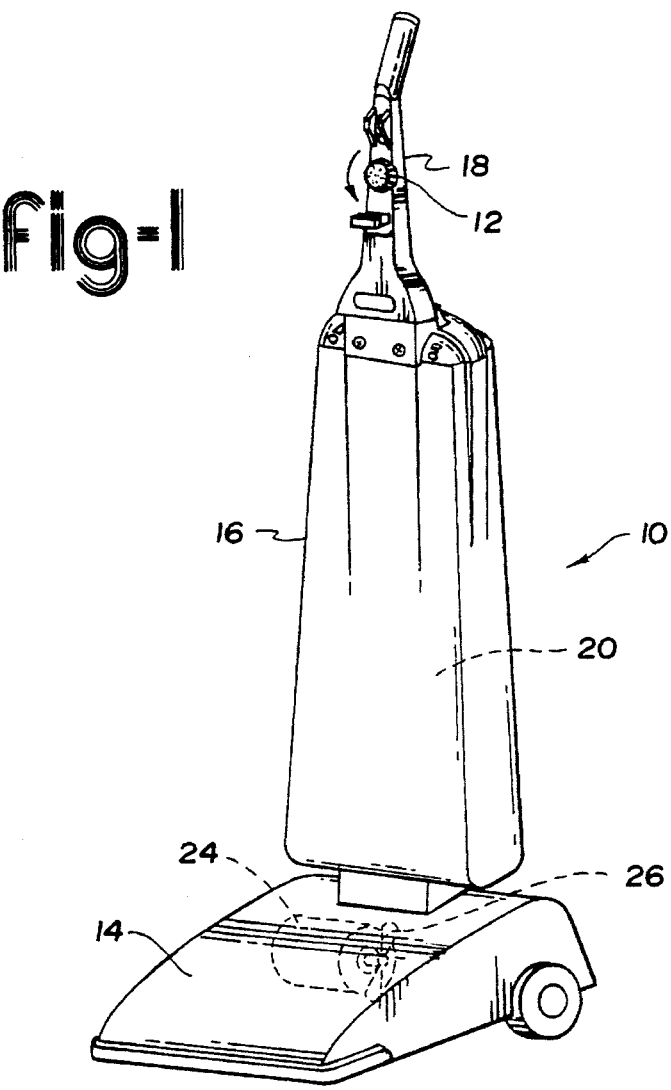
FIG. 1 is a perspective view of a vacuum cleaner using a control mechanism made in accordance with the present invention.

FIG. 1 is a perspective view of an upright vacuum cleaner 10 using a switch assembly 12 made in accordance with the present invention. Vacuum cleaner 10 has a lower housing 14 attached to an upright housing 16. Upright housing 16 includes a handle 18 having a cavity 22 (FIG. 6) in which switch assembly 12 is mounted. Located within upright housing 16 is a vacuum bag 20 for collecting dirt and debris drawn into vacuum cleaner 10.

A motor 24 and a fan 26 are supported within lower housing 14. Motor 24 is a variable speed motor which, in turn, drives fan 26 at a variable speed to create a vacuum of adjustable magnitude. Dirt vacuumed into vacuum cleaner 10 is collected in vacuum bag 20 in a conventional manner.

Figure 2:
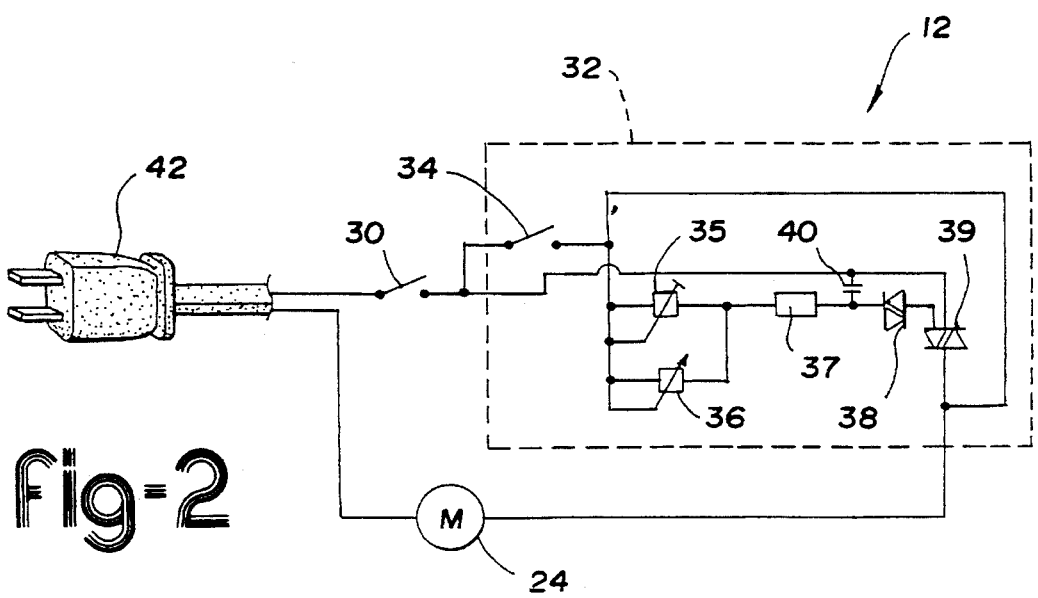
FIG. 2 is a schematic of the circuit used to operate the motor of the vacuum cleaner.

FIG. 2 is a schematic of the operation of switch assembly 12 and motor 24. Switch assembly 12 includes an on/off switch 30 in series with motor 24 and a variable speed control circuit 32. Control circuit 32 includes a bypass switch 34, a fixed potentiometer 35, a rheostat 36, a resistor 37, diac 38, triac 39 and a capacitor 40. An electrical plug 42 is connected to switch assembly 12 to supply electrical energy to motor 24.

When on/off switch 30 is closed, electrical current is delivered to motor 24 operating vacuum cleaner 10. Selectively positioning switch 30 into an open or off position turns motor 24 off.

Closing on/off switch 30 activates motor 24. If bypass switch 34 is placed in a closed or bypass position, current generally bypasses the highly resistive components including potentiometer 35, rheostat 36, resistor 37, and associated diac 38 and triac 39. Triac 39 is not activated when switch 34 is closed. Accordingly, virtually all of the current passing through switches 30 and 34 reaches motor 24 to operate motor 24 at a predetermined high or top speed.

Alternatively, if switch 34 is opened, motor 24 can be operated at variable speeds by varying the resistance in rheostat 36. Potentiometer 35 is preset at a fixed resistive value during manufacture and is not alterable by a user during normal use of the vacuum cleaner 10. This fixed resistive value is chosen, in conjunction with the variable resistance of rheostat 36 and the fixed resistance in resistor 37, to set lower and upper bounds to the operating speed of motor 24.

By varying the resistance of rheostat 36, the threshold voltage needed to activate diac 38 and triac 39 is adjustable to control the portion of the alternating current cycle which is allowed to pass through triac 39.

To operate motor 24 at a predetermined speed, bypass switch 34 is placed in a closed position essentially creating a short circuit bypassing triac 39. This allows maximum current and power to be drawn across motor 24.

Alternatively, if vacuum cleaner 10 and motor 24 are to be run at a low speed, on/off switch 30 is selectively positioned in the on or closed position and bypass switch 34 of variable speed control circuit 32 is placed in an open position allowing current to pass through triac 39. Rheostat 36 is then adjusted to control the threshold value of voltage need to operate triac 39. By varying the resistance in rheostat 36 and the corresponding operable threshold value on triac 39, the speed of motor 24 is correspondingly controlled.

Figure 4:
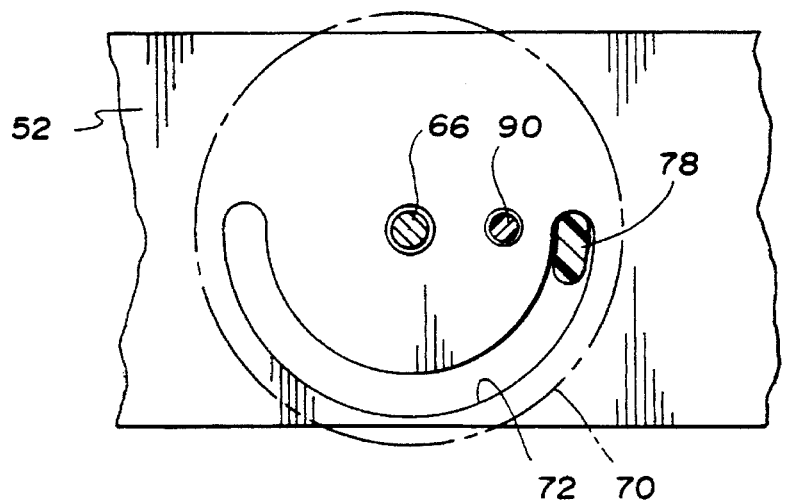
FIG. 4 is a sectional view taken along line 4—4 of FIG. 3.
Figure 5:
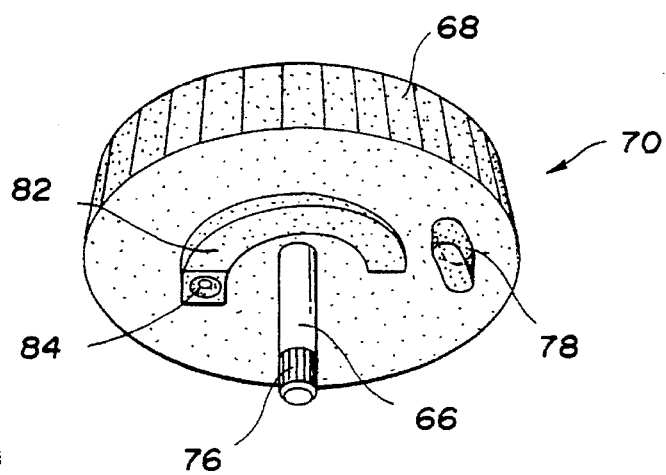
FIG. 5 is a perspective view of a control knob used to control the operation of the rheostat and bypass switch.
Figure 6:
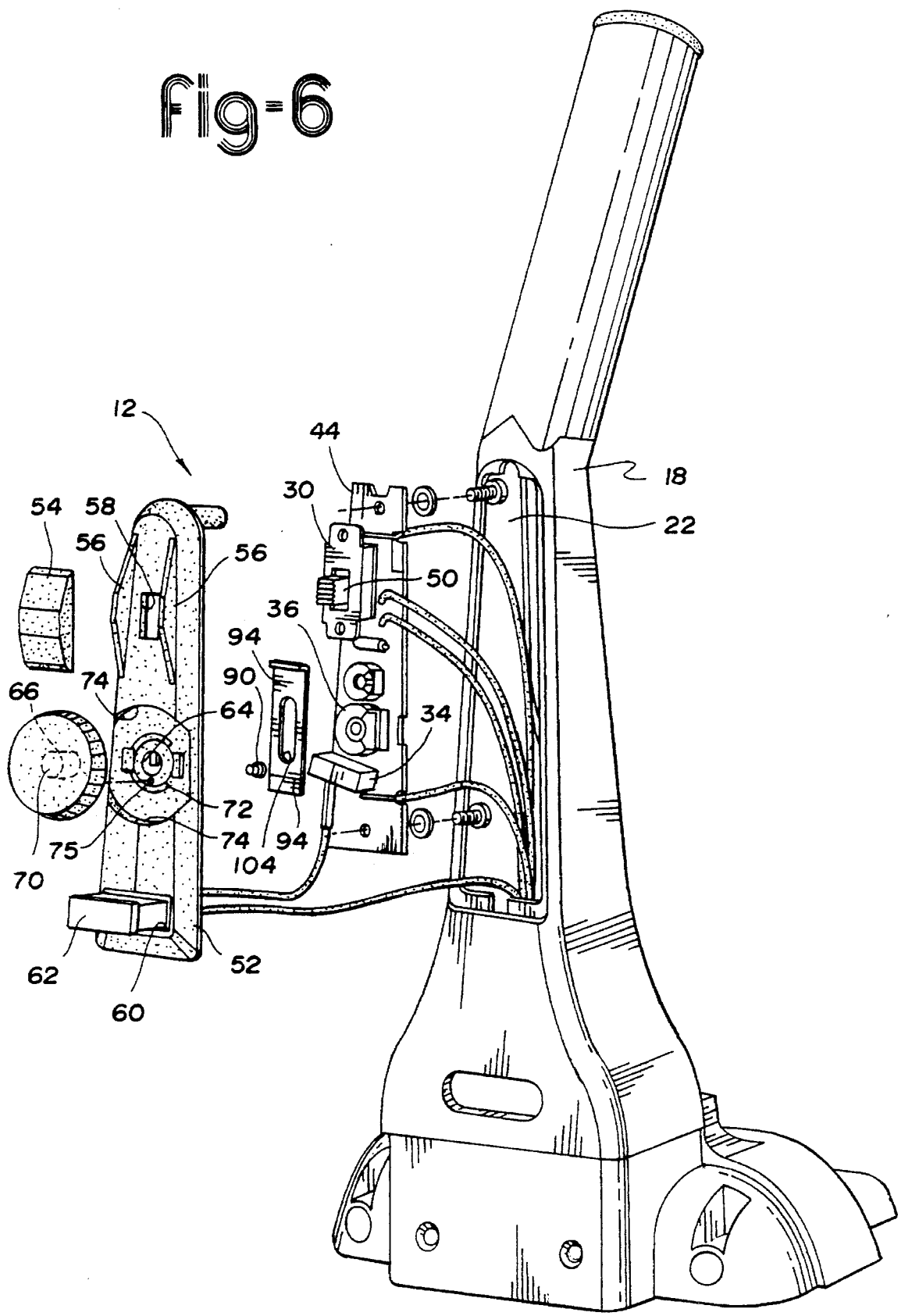
FIG. 6 is an exploded view of the switch assembly controlling the vacuum cleaner.

The physical embodiment of components of switch assembly 12 is best seen in FIGS. 3–6. Referring in particular to FIG. 6, switch assembly 12 includes printed circuit board (PCB) 44 on which on/off switch 30, rheostat 36 and bypass switch 34 are mounted. On/off switch 30 has an actuator 50 which is selectively translatable to open and close switch 30 thereby turning off and on motor 24.

Overlying printed circuit board 44 is a plastic molded cover plate 52. A switch cover 54 snaps over actuator 50 and is supported on its sides by a pair of flanges 56 formed in cover plate 52. An oversized rectangular opening 58 is provided in cover plate 52 to allow actuator 50 to move sufficiently to turn switch 30 on and off. At the other end of switch cover 54 is an opening 60 through which a light assembly 62 projects. Light assembly 62 has a light for indicating when vacuum bag 20 is full.

An aperture 64 for receiving a stem 66 of a control knob 70 is also provided in cover plate 52. An arcuate alignment groove 72 is concentrically formed in cover plate 52 about aperture 64. Located radially outward from groove 72 are a pair of opposing spaced arcuate walls 74 sized so that control knob 70 may rotate therebetween. A plunger opening 75 is located adjacent aperture 64.

Turning now to FIG. 5, control knob 70 is shown. A disk-shaped grip portion 68 allows control knob 70 to be easily rotated. Stem 66 has external splines 76 which cooperate with corresponding internal splines (not shown) in rheostat 36 so that rheostat 36 rotates with control knob 70. A downwardly depending alignment rib 78 is provided to slide within alignment groove 72 of cover plate 52 thereby providing support to control knob 70 and limiting its rotational range of motion. An arcuate ramp 82 of varying height is also formed on the underside of control knob 70. At one end of ramp 82 is a detent 84.

Figure 3:
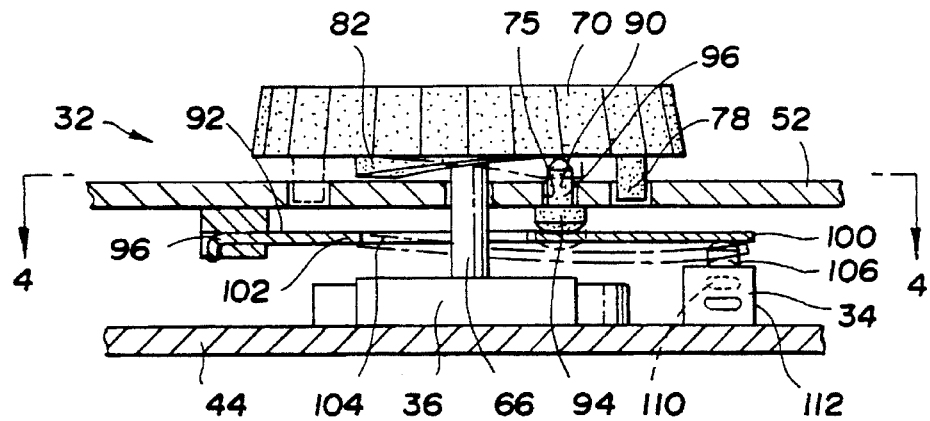
FIG. 3 is a fragmentary view, partially in section, of a control knob, rheostat and bypass switch.

Components of the control mechanism are best seen in FIG. 3 and include control knob 70, a plunger 90, a cantilevered beam 92, and bypass switch 34. Plunger 90 has an enlarged head 94 and a body 96 which extends through plunger opening 75 in cover plate 52. Enlarged head 94 rests upon cantilevered beam 92. Plunger body 96 is received within detent 84 when control knob 70 is fully rotated counterclockwise, as viewed in FIG. 4.

Cantilevered beam 92 is a thin, flexible piece of steel which has a fixed end 96 attached to cover plate 52, a free end 100 and a central span 102 extending between fixed and free ends 96 and 100. An oval aperture 104 is located in central span 102 to receive stem 66 of control knob 70. Enlarged head 94 abuts central span 102. Free end 100 is movable to contact and depress bypass switch 34. Bypass switch 34 has a plunger 106 which is biased to an open position to separate a pair of contacts 110 and 112 which are shown in phantom.

In operation, on/off switch cover 54 is moved downward closing switch 30 and causing motor 24 to be activated. Control knob 70 and rheostat 36 may be rotated to a slow operating speed position with ramp 82 and detent 84 being disengaged from plunger 90, as shown in FIG. 3. This corresponds to turning control knob 70 completely clockwise as viewed in FIG. 4. Rotating control knob 70 counterclockwise reduces the resistance in rheostat 36 and increases the current passing through, and the speed of, motor 24.

When control knob 70 is rotated completely counterclockwise, as shown in FIG. 4 and in phantom in FIG. 3, ramp 82 will engage and depress plunger 90. Detent 84 receives the top of body 96 of plunger 90 to prevent plunger 90 from becoming inadvertently disengaged from ramp 82. Plunger 90, in turn, depresses central span 102 of cantilevered beam 92 causing free end 100 to engage and depress plunger 106 of bypass switch 34. Consequently, contacts 110 and 112 are closed allowing bypass switch 34 to essentially short circuit variable speed control circuit 32 and current to bypass triac 39.

The flexibility of cantilevered beam 92 allows the individual components of variable speed control circuit 32 to be made with relatively large manufacturing tolerances while accommodating the stack-up of tolerances during assembly of these components. This is due to the large range of motion central span 102 can deflect through while placing only a limited force across free end 100 and plunger 106. Therefore, contacts 110 and 112 are not crushed during the depression of plunger 106.

While this invention has been described in the foregoing specification in relation to a certain preferred embodiment thereof, and many details have been set forth for the purposes of illustration, it will become apparent to those skilled in the art that the invention is susceptible to additional embodiments and that certain details described herein can be varied considerably without departing from the basic principles of the invention. For example, electrical implements other than a vacuum cleaner could utilize the above-described central unit.

What is claimed is:

1. An electrical implement for performing an operation on an object, the implement comprising:
    a tool for operating on the object;
    a variable speed electrical motor activatable for driving said tool;
    a housing supporting said motor and tool; and
    a control unit for controlling the speed of said motor, the control unit including:
        an on/off switch and a variable speed control circuit;
        said on/off switch being selectively positionable between closed and open positions to activate and deactivate the motor;
        said variable speed control circuit including a variable resistance rheostat and a bypass switch, the speed control circuit being in series with said motor and said on/off switch, and control means for selectively controlling the variable resistance of said rheostat;
    wherein when said on/off switch is open, said motor is deactivated; and
    wherein when said on/off switch is closed, said motor is activated;
    wherein when said bypass switch is closed, said motor is operated at a predetermined speed and when said bypass switch is opened, the resistance of said rheostat is continuously variable by said control means to control the speed of said motor and tool at a speed less than said predetermined speed.

2. The electrical implement of claim 1 wherein said tool is a source of vacuum.

3. An electrical implement for performing an operation on an object, the implement comprising:
    a tool for operating on the object;
    a variable speed electrical motor activatable for driving said tool;
    a housing supporting said motor and tool; and
    a control unit for controlling the speed of said motor, the control unit including:
        an on/off switch and a variable speed control circuit;
        said on/off switch being selectively positionable between closed and open positions to activate and deactivate the motor;
        said variable speed control circuit including a variable resistance rheostat and a bypass switch, the speed control circuit being in series with said motor and said on/off switch, and control means for selectively controlling the variable resistance of said rheostat;
        said control means includes a single means for controlling the resistance of said rheostat and the opening and closing of said bypass switch;
    wherein when said on/off switch is open, said motor is deactivated; and
    wherein when said on/off switch is closed, said motor is activated;
    wherein when said bypass switch is closed, said motor is operated at a predetermined speed and when said bypass switch is operated, the resistance of said rheostat is variable by said control means to control the speed of said motor and tool at a speed less than said predetermined speed.

4. The electrical implement of claim 3 wherein:
    said single means includes a movable control knob connected to said rheostat to vary the resistance of said rheostat.

5. The electrical implement of claim 4 wherein:
    said single means includes a cantilevered beam having a first fixed end fixed relative to the housing, a second free end movable relative to said first end and engageable with said bypass switch to close said bypass switch, and a central span extending between the fixed and free ends;
    wherein when said control knob is moved to a predetermined closed position, the control knob depresses and flexes the central span of the beam with the free end of the beam closing the bypass switch.

6. The electrical implement of claim 5 wherein:
    said single means further includes a plunger movably mounted between said control knob and said central span whereby said control knob is movable to depress said plunger which depresses the central span closing said bypass switch.

7. The electrical implement of claim 6 wherein:
    said control knob has a rotatable grip portion and a stem connected to said rheostat, said grip portion having a ramp which is engageable with said plunger when said grip portion is rotated to depress said plunger.

8. The electrical implement of claim 4 wherein:
    said control knob is rotatable relative to said housing to control the speed of said motor and to control the opening and closing of said bypass switch.

9. The electrical implement of claim 3 wherein:
    the control circuit includes a triac controlled by the variable resistance rheostat to determine when the triac will allow current to pass therethrough when the bypass switch is open and when the bypass switch is closed, the current generally bypasses the rheostat and triac.

10. In a vacuum cleaner having a motor and a source of vacuum operable by said motor and a switch arrangement for operating said motor at variable speed for varying the vacuum of the vacuum cleaner, said switch arrangement including a control knob and an electrical circuit having a first switch and a control circuit connectable to a source of electrical energy and in series with each other and said motor, said control circuit having a bypass switch and a rheostat;
    said first and bypass switches having first positions in said circuit for bypassing said rheostat and connecting said motor to said source of electrical energy for operating said motor at a predetermined speed;
    said bypass switch having a second position in said control circuit for connecting said rheostat and motor with said source of electrical energy for operating said motor at a speed different than said predetermined speed; and
    the control knob being movable to control both the resistance of the rheostat in the control circuit and the positioning of the bypass switch so that the speed of the motor can be controlled.

11. The vacuum cleaner of claim 10 further comprising:
    a cantilevered beam interposed between said control knob and said bypass switch, said cantilevered beam having a fixed end fixed relative to said bypass switch, a free end moveable relative to and engageable with said bypass switch, and a central span depressible by said control knob to place the bypass switch in its first position wherein the rheostat is bypassed and the motor is operable at the predetermined speed.

12. The vacuum cleaner of claim 10 further comprising:

a triac in electrical communication with the rheostat whereby the varying the resistance in the rheostat varies the opening and closing of the triac to control the speed of the motor when the bypass switch is in the second position.

13. An electrical implement for performing an operation on an object, the implement comprising:

a tool for operating on an object;

a variable speed electrical motor activatable for driving said tool;

a housing supporting said motor and tool; and a control unit for controlling the speed of said motor, the control unit including:

a control circuit connectible to a source of electrical energy and in electrical communication with the motor, the control circuit having a rheostat and a bypass switch, wherein when the bypass switch is placed in a first position the motor is operated at a predetermined speed, and when the bypass switch is placed in a second position, varying the resistance of the rheostat will vary the speed of the motor; and a control mechanism including a movable control knob and a cantilevered beam, the cantilevered beam having a fixed end fixed relative to the housing, a free end movable relative to the housing and engageable with the bypass switch, and having a central span extending between the free and fixed ends, and the control knob connecting to the rheostat and engageable with the central span of the beam;

wherein the control knob may be moved to control the movement of the cantilevered beam and the selective positioning of the bypass switch between the first and second positions and also varying the resistance in the rheostat so that when the bypass switch is placed in the first position the motor is operated at a predetermined speed and when the bypass switch is placed in the second position the control knob may be moved to vary the resistance of the rheostat and the speed of the motor.

* * * * *

UNITED STATES PATENT AND TRADEMARK OFFICE
CERTIFICATE OF CORRECTION

PATENT NO. : 5,455,886
DATED : October 3, 1995
INVENTOR(S) : Glenn et al.

It is certified that error appears in the above-indentified patent and that said Letters Patent is hereby corrected as shown below:

Column 5, Line 62, Claim 3:

Delete "operated" and insert -- opened --.

Signed and Sealed this

Fifth Day of March, 1996

BRUCE LEHMAN

*Attest:*

*Attesting Officer*    Commissioner of Patents and Trademarks